(12) United States Patent
Khan et al.

(10) Patent No.: US 9,723,426 B2
(45) Date of Patent: Aug. 1, 2017

(54) SUBSCRIPTION-AWARE AND UPDATES-AWARE SIM PROCESS

(71) Applicant: Verizon Patent and Licensing Inc., Arlington, VA (US)

(72) Inventors: Taussif Khan, Monroe, NJ (US); Zhengfang Chen, Millburn, NJ (US); Warren Hojilla Uy, Randolph, NJ (US); Ruben Cuadrat, New York, NY (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/742,284

(22) Filed: Jun. 17, 2015

(65) Prior Publication Data

US 2016/0373880 A1 Dec. 22, 2016

(51) Int. Cl.
| | |
|---|---|
| *H04M 3/00* | (2006.01) |
| *H04W 4/00* | (2009.01) |
| *H04W 8/20* | (2009.01) |
| *H04W 12/00* | (2009.01) |
| *H04W 8/18* | (2009.01) |
| *H04W 48/14* | (2009.01) |

(52) U.S. Cl.
CPC ........... *H04W 4/001* (2013.01); *H04W 4/003* (2013.01); *H04W 8/205* (2013.01); *H04W 12/00* (2013.01); *H04W 8/183* (2013.01); *H04W 48/14* (2013.01)

(58) Field of Classification Search
CPC ..... H04W 4/001; H04W 8/183; H04W 8/205; H04W 8/26; H04W 48/14
USPC .......................................................... 455/419
See application file for complete search history.

(56) References Cited

U.S. PATENT DOCUMENTS

| | | | |
|---|---|---|---|
| 7,539,514 B2 * | 5/2009 | Shieh .................... | H04W 8/265 380/249 |
| 2013/0231080 A1 | 9/2013 | Cheuk et al. | |
| 2014/0045474 A1 | 2/2014 | Cheuk et al. | |
| 2015/0341779 A1 * | 11/2015 | Dawson-Haney ...... | H04W 8/18 455/418 |
| 2016/0037328 A1 * | 2/2016 | Raveendran ........... | H04W 8/08 370/328 |

* cited by examiner

*Primary Examiner* — Amancio Gonzalez

(57) ABSTRACT

A wireless communication device may include a Subscriber Identity Module (SIM) card configured to store a subscriber profile. The wireless communication device may further include logic configured to detect attachment to a wireless access network; detect a non-activated Subscriber Identity Module (SIM) card; receive a Protocol Configuration Options (PCO) message from the wireless access network; retrieve subscription status information for the SIM card from the received PCO message; determine whether the SIM card has a valid subscription based on the retrieved subscription status information; and instruct the SIM card not to initiate an activation process with a SIM Over-the-air (OTA) system, in response to determining that the SIM card does not have a valid subscription.

20 Claims, 10 Drawing Sheets

| PCO HEADER 710 | |
|---|---|
| PROTOCOL ID 720-A | PROTOCOL CONTENT 725-A |
| ⋮ | ⋮ |
| PROTOCOL ID 720-N | PROTOCOL CONTENT 725-N |
| CONTAINER ID 730-A | CONTAINER CONTENT 735-A |
| ⋮ | ⋮ |
| SUBSCRIPTION STATUS CONTAINER ID (730-X) | SUBSCRIPTION STATUS 735-X |
| ⋮ | ⋮ |
| UPDATE STATUS CONTAINER ID (730-Y) | UPDATE STATUS 735-Y |
| ⋮ | ⋮ |
| CONTAINER ID 730-N | CONTAINER CONTENT 735-N |

FIG. 7

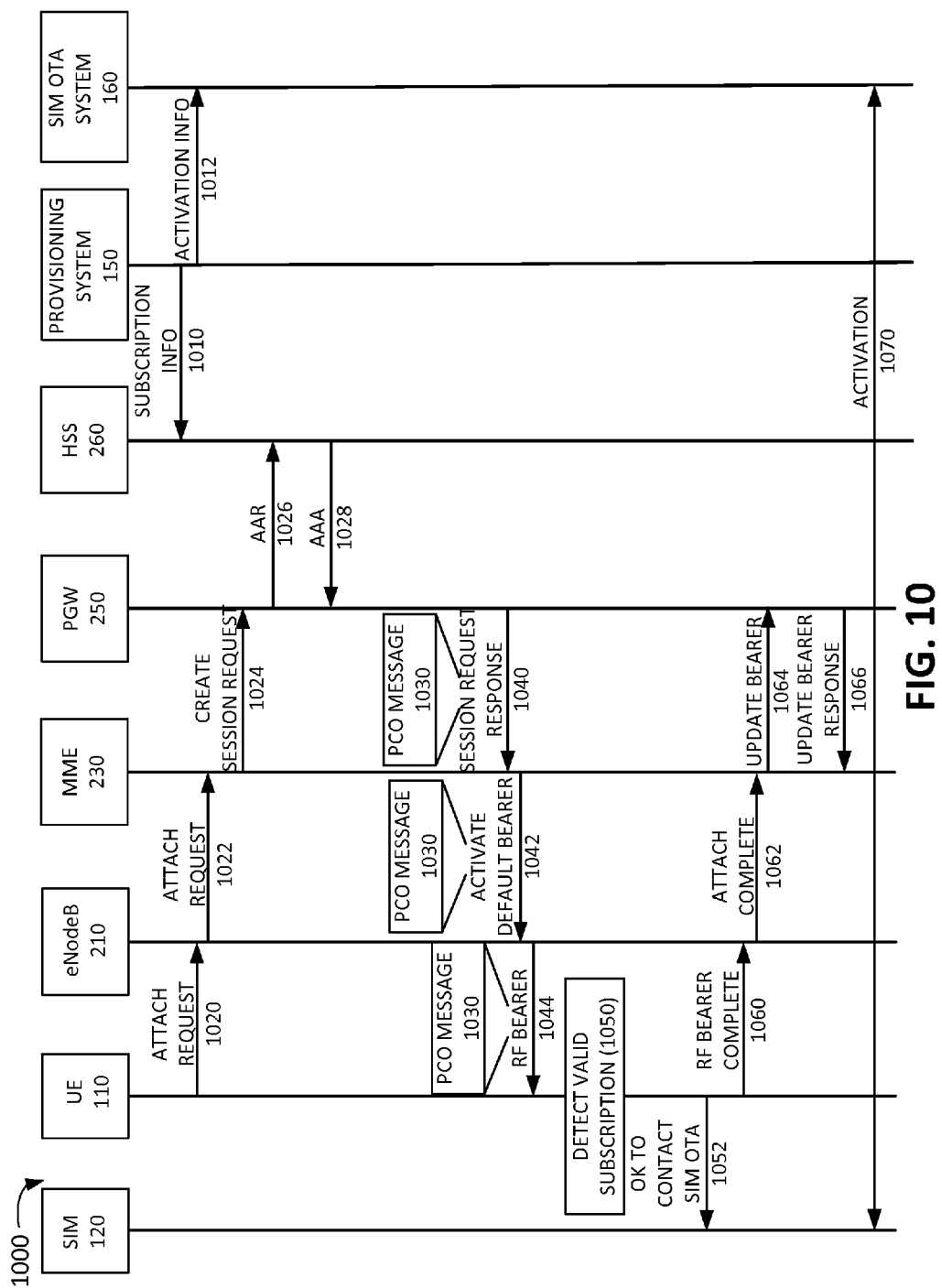

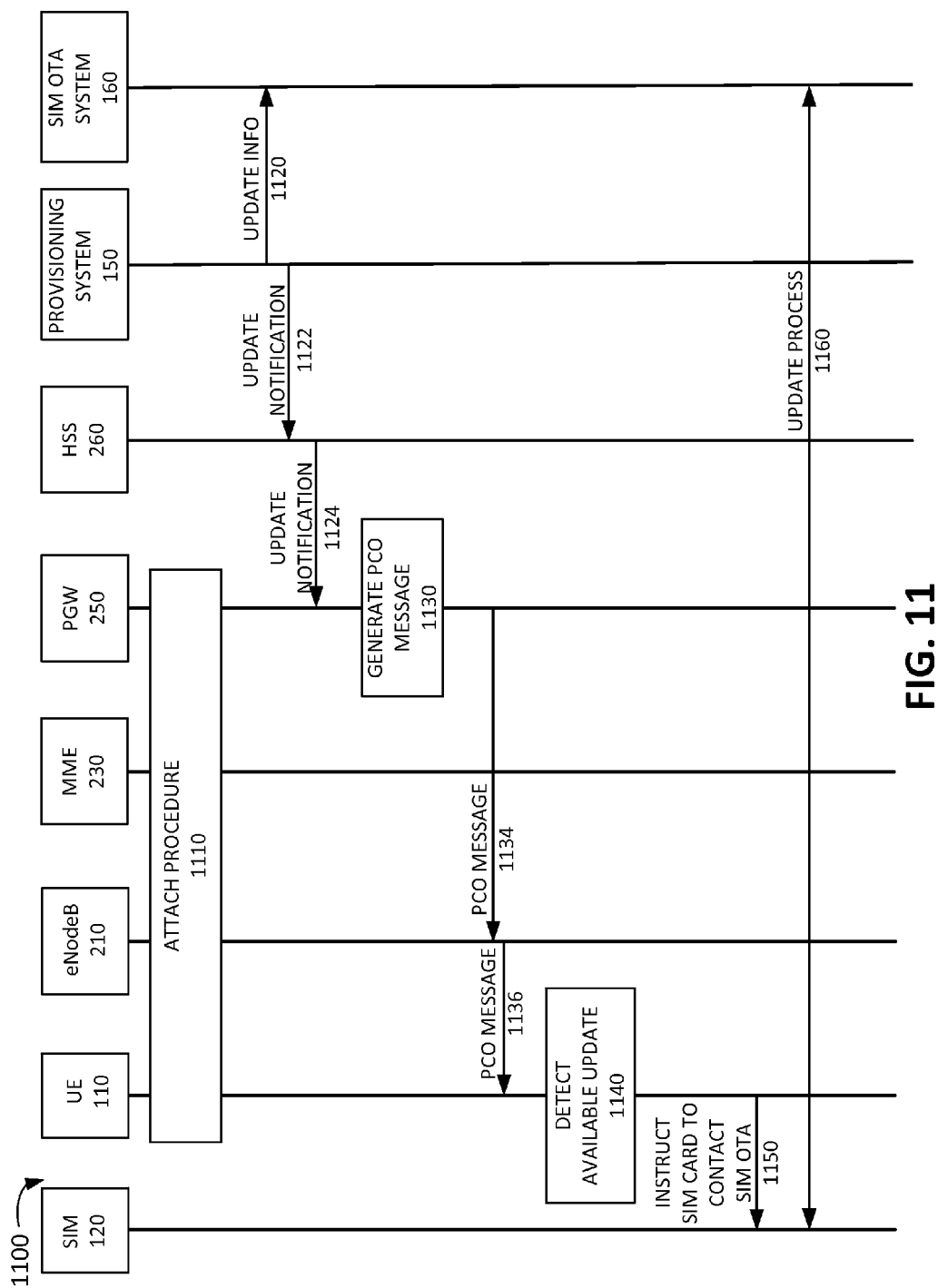

SUBSCRIPTION-AWARE AND UPDATES-AWARE SIM PROCESS

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A mobile communication device may include a Subscriber Identity Module (SIM) card that includes information that enables the mobile communication device to connect to a wireless access network.

BRIEF DESCRIPTION OF THE DRAWINGS

FIG. 7 is a diagram illustrating an exemplary Protocol Configuration Option (PCO) message according to an implementation described herein;

FIG. 10 is an exemplary signal flow diagram according to an implementation described herein; and FIG. 11 is an exemplary signal flow diagram according to an implementation described herein.

DETAILED DESCRIPTION OF PREFERRED EMBODIMENTS

Figure 1:
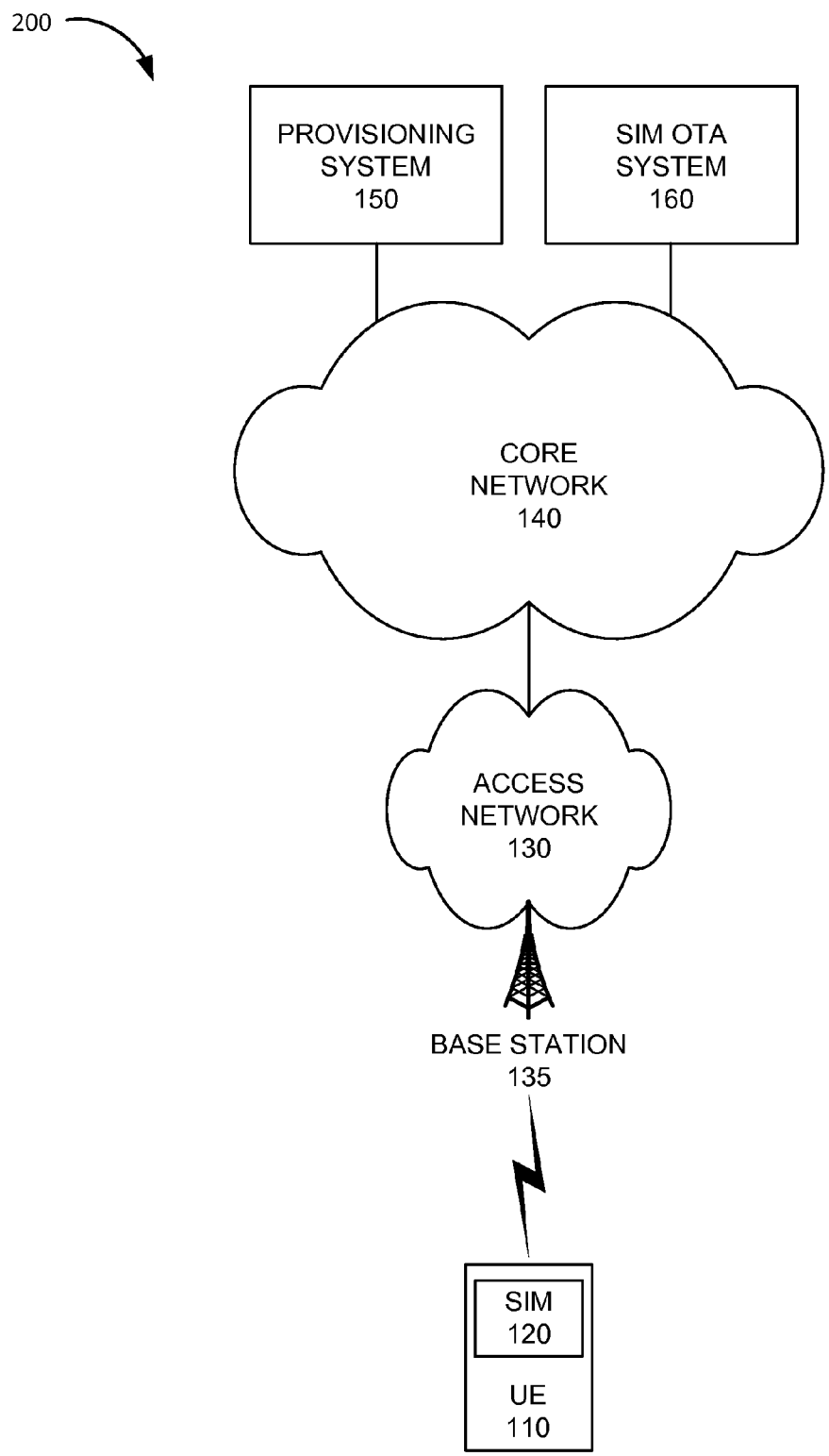
FIG. 1 is a diagram illustrating an environment according to an implementation described herein.

The following detailed description refers to the accompanying drawings. The same reference numbers in different drawings identify the same or similar elements.

A SIM card connected to a wireless communication device may be in a non-activated state or in an activated state. In order for a subscription to be activated and in order for the wireless communication device to receive service (e.g., Internet Protocol (IP) connectivity, voice communication, etc.), the SIM card may need to be activated. A SIM card may be activated wirelessly using an Over-the-air (OTA) process by connecting to a SIM OTA system. A SIM card may be configured to automatically contact to a SIM OTA system if the SIM card is in a non-activated state and the wireless communication device connects to a wireless access network. However, if the SIM card is not associated with a valid subscription, an activation request may be rejected by the SIM OTA system, resulting in the SIM card unnecessarily using up network bandwidth and the resources of the wireless access network and/or SIM OTA system.

Furthermore, the SIM card may need to perform periodic updates to update authentication keys, applications, and/or other types of information stored on the SIM card. The SIM card may contact the SIM OTA system each time the SIM card is powered on (e.g., when the wireless communication device is powered on), each time the wireless communication device attaches to a wireless network, and/or at particular intervals. However, if no updates need to be performed, the SIM card may needlessly reach out to the SIM OTA system, resulting in the SIM card unnecessarily using network bandwidth and the resources of the wireless access network and/or SIM OTA system.

Moreover, in some implementations, a SIM card may have been activated previously, but may need to be reactivated. For example, a SIM card in a smart meter may communicate with a utility company to report customer usage of a utility (e.g., power, gas, water, etc.). If a first customer moves away from a home associated with the smart meter and a second customer moves in, the SIM card of the smart meter may need to be re-activated with a new subscription. Thus, the SIM card may contact the SIM OTA system for updates only to receive an indication from the SIM OTA system that the SIM card is not associated with a valid subscription. The SIM card may need to revert back to a non-activated state and then may need to contact the SIM OTA system to reactivate, leading to unnecessary network traffic and tying up of resources of the wireless access network and the SIM OTA system.

Implementations described herein relate to a subscription-aware process for a SIM card. Before a SIM card contacts to a SIM OTA system, the SIM card may confirm that a valid subscription exists for the SIM card. In some implementations, the process may be performed by the wireless communication device connected to the SIM card. The wireless communication device may detect attachment to a wireless access network and may detect a non-activated SIM card. The wireless communication device may instruct the SIM card not to initiate an activation process until a determination is made by the wireless communication device that the activation process is to proceed. The wireless access network may correspond to a wireless access network configured to send Protocol Configuration Options (PCO) messages to the wireless communication device. For example, the wireless access network may correspond to a Long Term Evolution (LTE) access network, an enhanced High Rate Packet Data (eHRPD) access network, and/or another type of wireless access network.

The wireless communication device may wait until a PCO message is received from the wireless access network. A provisioning system may maintain subscription information and may send subscription status information relating to the SIM card to the SIM OTA system. Furthermore, the provisioning system may send the subscription status information to the wireless access network. For example, the provisioning system may send the subscription status information to a Home Subscriber Server (HSS) that maintains information associated with subscribers of the wireless access network. When the wireless communication device attaches to the wireless access network, the wireless access network may authenticate the wireless communication device by communicating with the HSS and may obtain the subscription status information for the SIM card from the HSS. The wireless access network may then generate a PCO message and may include the subscription status of the SIM card in the PCO message in a container field assigned to carry subscription status information.

In some implementations, the PCO message may be sent to the wireless communication device by a Packet Data Network Gateway (PGW) device of an LTE wireless access network. In other implementations, the PCO message may be sent to the wireless communication device by a Mobility Management Entity (MME) device of an LTE wireless access network.

The wireless communication device may receive the PCO message from the wireless access network and may retrieve the subscription status information from the container field of the PCO message assigned to carry subscription status information. The wireless communication device may use the retrieved subscription status information to determine whether the SIM card has a valid subscription and/or whether the subscription has any imposed restrictions (e.g., data restrictions when accessing the Internet, a restriction because of an unpaid balance, etc.). If the SIM card does not have a valid subscription or has particular imposed restrictions placed on an existing subscription, the wireless communication device may instruct the SIM card not to initiate an activation process with a SIM OTA system.

Furthermore, the container field in the PCO message may include additional information, such as a telephone number assigned to the SIM card. The telephone number may correspond to a Mobile Station International Subscriber Directory Number (MSISDN), an International Mobile Subscriber Identity (IMSI) number, a Mobile Directory Number (MDN), and/or another type of telephone number. In situations in which the SIM card has already been activated, but in which the subscription has changed to a different telephone number, the SIM card may need to be reactivated.

The wireless communication device may retrieve the telephone number for the SIM card from the received PCO message, may determine whether the retrieved telephone number is different from a previous assigned telephone number for the SIM card, may instruct the SIM card not to initiate the activation process with the SIM OTA system if the retrieved telephone number is the same as the previously assigned telephone number for this SIM card, and may instruct the SIM card to initiate the activation process with the SIM OTA system if the retrieved telephone number is different from the previously assigned telephone number for this SIM card. In some implementations, the SIM card may not be required to reactivate with the SIM OTA system if the telephone number is determined to be different from the previously assigned telephone number. Rather, the wireless communication device may update the previously assigned telephone number for the SIM card with the retrieved telephone number and may instruct the SIM card not to initiate the activation process with the SIM OTA system.

Implementations described herein further relate to an update-aware process for a SIM card. Rather than having the SIM card contact a SIM OTA system for updates automatically upon powering up, the SIM card may wait until an indication is received that an update is available for the SIM card. Update information may be included in another container field of a PCO message. When the provisioning system generates an update for the SIM card, the provisioning system may provide information relating to the update to the SIM OTA system. Furthermore, the provisioning system may send an indication to the wireless access system that an update is available. In response, the wireless access system may generate a PCO message with update status information included in a container field assigned to store update status information and may send the PCO message to the wireless communication device (e.g., by a PGW device, MME device, and/or another device).

The wireless communication device may receive the PCO message, identify the container field assigned to include the update status information, and retrieve the update status information from the identified container field. The wireless communication device may determine that an update is available for the SIM card and may instruct the SIM card to initiate an update process with the SIM OTA system, in response to determining that an update is available for the SIM card.

In other implementations, the subscription-aware process and/or the update-aware process may be carried out by the SIM card, rather than by the wireless communication device connected to the SIM card. For example, the SIM card may detect that the wireless communication device associated with the SIM card has attached to the wireless access network; may receive a PCO message from the wireless communication device; may retrieve subscription status information for the SIM card from the received PCO message; may determine whether the SIM card has a valid subscription based on the retrieved subscription status information; may select not to initiate an activation process with a SIM Over-the-air (OTA) system, in response to determining that the SIM card does not have a valid subscription; may retrieve a telephone number for the SIM card from the received PCO message in response to determining that the SIM card does have a valid subscription; may determine whether the retrieved telephone number is different from a previous assigned telephone number for the SIM card; may select not to initiate the activation process with the SIM OTA system, in response to determining that the retrieved telephone number is not different from the previously assigned telephone number for this SIM card; and may select to initiate the activation process with the SIM OTA system, in response to determining that the retrieved telephone number is different from the previously assigned telephone number for this SIM card. Furthermore, the SIM card may retrieve update status information for the SIM card from the received PCO message; may determine whether an update is available for the SIM card based on the retrieved update status information; and may initiate an update process with the SIM OTA system, in response to determining that an update is available for the SIM card.

FIG. 1 is a diagram of an exemplary environment 100 in which the systems and/or methods, described herein, may be implemented. As shown in FIG. 1, environment 100 may include a UE 110, an access network 130, a core network 140, a provisioning system 150, and a SIM OTA system 160.

UE 110 may include a mobile communication device (e.g., a mobile phone, a smart phone, a phablet device, a wearable computer device (e.g., a head-mounted display computer device, a wristwatch computer device, etc.), a global positioning system (GPS) device, and/or another type of wireless device); a laptop computer, a tablet computer, or another type of portable computer; a media playing device; a portable gaming system; and/or any other type of mobile computer device with communication and output capabilities.

In some implementations, UE 110 may correspond to an embedded wireless device that communicates wirelessly with other devices over a machine-to-machine (M2M) interface. For example, UE 110 may be electrically connected to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device.

UE 110 may include a SIM card 120. SIM card 120 may store information for multiple subscriptions that may be activated for UE 110. SIM card 120 may be electrically coupled to UE 110 by being inserted into a slot of UE 110 (not shown in FIG. 1). UE 110 may wirelessly communicate with one or more of access networks 130.

Access network 130 may provide access to core network 140 for wireless devices, such as UE 110. Access network 130 may enable UE 110 to provide mobile telephone service and/or data services to UE 110. Access network 130 may include a base station 135 and UE 110 may wirelessly communicate with access network 130 via base station 135. Access network 130 may establish a packet data network connection between UE 110 and core network 140. For example, access network 130 may establish an Internet Protocol (IP) connection between UE 110 and core network 140.

In some implementations, access network 130 may include a Long Term Evolution (LTE) access network (e.g., an evolved packet core (EPC) network) based on the LTE standard specified by the 3$^{rd}$ Generation Partnership Project (3GPP). In other implementations, access network 130 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

Core network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE 110, and may interface with other external networks. Core network 140 may include one or more server devices and/or network devices, or other types of computation or communication devices. In one example implementation, core network 140 may include an Internet Protocol Multimedia Sub-system (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

Provisioning system 150 may include one or more devices, such as computer devices and/or server devices, which maintain provisioning information for UEs 110 and/or SIM cards 120. For example, when a customer orders and/or purchases a subscription, provisioning system 150 may provision the subscription with respect to access system 130 and/or SIM OTA system 160. Furthermore, provisioning system 150 may assign telephone numbers to SIM cards 120 (e.g., MSISDN, MDN, IMSI, etc.), may store authentication keys for SIM cards 120, may maintain authentication, updates, and/or billing applications for SIM cards 120, and/or may maintain other types of information. Provisioning system 150 may maintain subscription status information for particular SIM cards 120 and may provide the subscription status information to SIM OTA system 160 and/or to access system 130. Furthermore, provisioning system 150 may generate updates for the stored information and/or maintained application and may provide the updates to SIM OTA system 160 and may send an indication to access system 130 that an update is available for SIM card 120.

SIM OTA system 160 may include one or more devices, such as computer devices and/or server devices, which perform OTA activation and/or OTA updates for SIM card 120. For example, SIM OTA system 160 may authenticate SIM card 120 via access network 130 and/or may provide an assigned telephone number to SIM card 120. Furthermore, SIM OTA system 160 may provide updates to SIM card 120, such as updating authentication keys, updating an application on SIM card 120 (e.g., a billing application), updating a partner list of Mobile Network Operators (MNOs), updating a roaming list for SIM card 120, and/or performing other types of updates.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
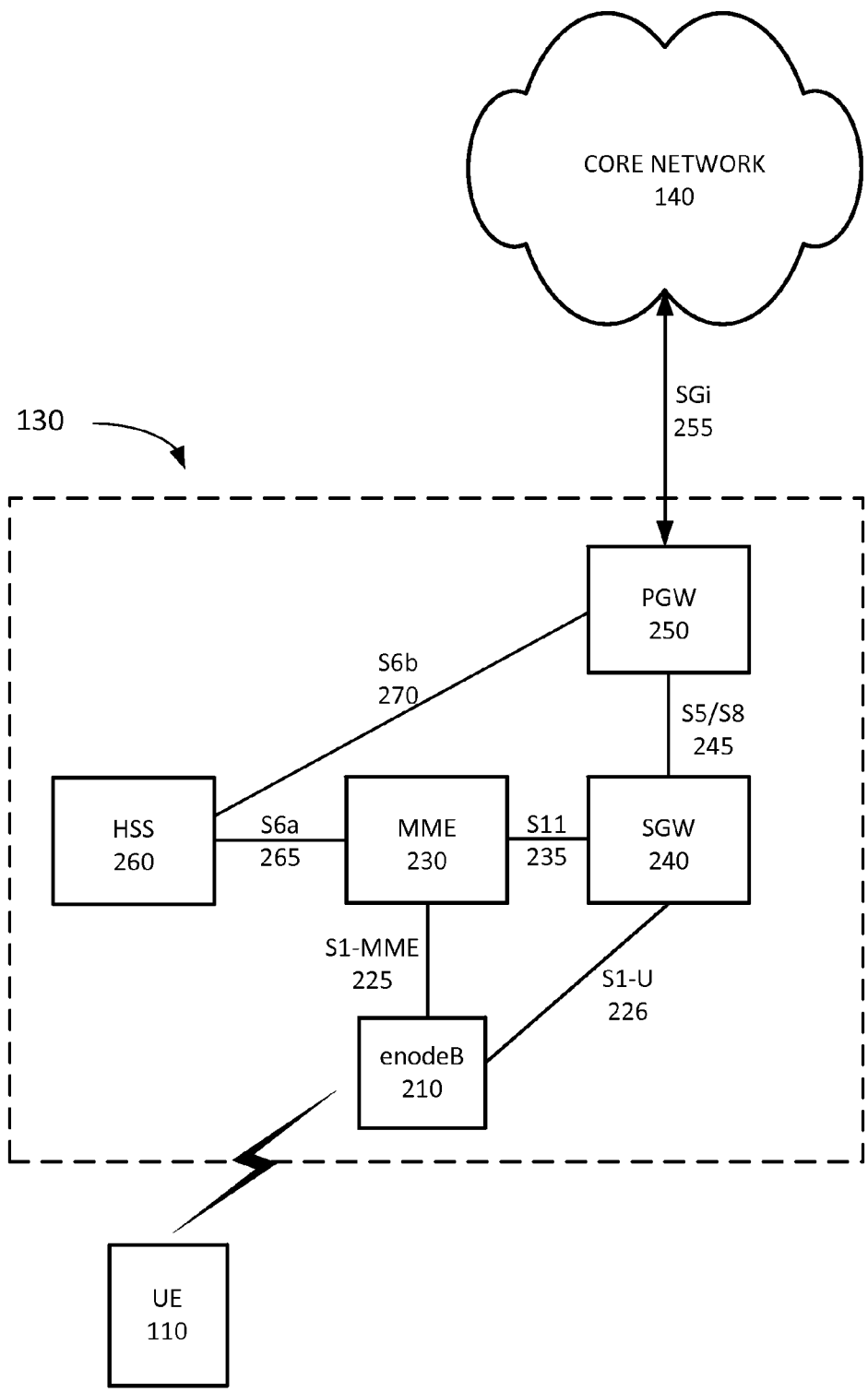
FIG. 2 is a diagram illustrating exemplary components of the access network of FIG. 1.

FIG. 2 is a diagram illustrating example components of access network 130 according to an implementation described herein. As shown in FIG. 2, access network 130 may correspond to a Long Term Evolution (LTE) access network. Access network 130 may include one or more devices that implement logical entities interconnected via standardized interfaces, and that provide wireless packet-switched services and wireless IP connectivity to user devices for both data and voice services. Access network 130 may include eNodeB 210 (corresponding to base station 135), a mobility management entity (MME) device 230, a serving gateway (SGW) device 240, a packet data network gateway (PGW) device 250, and a home subscriber server (HSS) device 260. While FIG. 2 depicts a single eNodeB 2100, MME device 230, SGW 240, PGW device 250, and HSS device 260 for illustration purposes, in other implementations FIG. 2 may include multiple eNodeBs 210, MME devices 230, SGW devices 240, PGW devices 250, and/or HSS devices 260.

eNodeB 210 may include one or more devices (e.g., base stations) and other components and functionality that allow UE 110 to wirelessly connect to access network 130. eNodeB 210 may interface with access network 130 via an interface referred to as an S1 interface, which may be split into a control plane S1-MME interface 225 and a data plane S1-U interface 226. S1-MME interface 225 may interface with MME device 230. S1-MME interface 225 may be implemented, for example, with a protocol stack that includes a Network Access Server (NAS) protocol and/or Stream Control Transmission Protocol (SCTP). An S1-U interface 226 may interface with SGW 240 and may be implemented, for example, using a General Packet Radio Service Tunneling Protocol version 2 (GTPv2).

MME device 230 may implement control plane processing for access network 130. For example, MME device 230 may implement tracking and paging procedures for UE 110, may activate and deactivate bearers for UE 110, may authenticate a user of UE 110, and may interface to non-LTE radio access networks. A bearer may represent a logical channel with particular quality of service (QoS) requirements. MME device 230 may also select a particular SGW 240 for a particular UE 110. A particular MME device 230 may interface with other MME devices 230 in access network 130 and may send and receive information associated with UEs, which may allow one MME device to take over control plane processing of UEs serviced by another MME device, if the other MME device becomes unavailable.

SGW device 240 may provide an access point to and from UE 110, may handle forwarding of data packets for UE 110, and may act as a local anchor point during handover procedures between eNodeBs 210. SGW device 240 may interface with PGW device 250 through an S5/S8 interface 245. S5/S8 interface 245 may be implemented, for example, using GTPv2.

PGW device 250 may function as a gateway to core network 140 through an SGi interface 155. Core network 140 may include, for example, an IP Multimedia Subsystem (IMS) network, which may provide voice and multimedia services to UE 110, based on Session Initiation Protocol (SIP). A particular UE 110, while connected to a single SGW 240, may be connected to multiple PGW devices 250, one for each packet network with which UE 110 communicates.

MME device 230 may communicate with SGW 240 through an S11 interface 235. S11 interface 235 may be implemented, for example, using GTPv2. S11 interface 235 may be used to create and manage a new session for a particular UE 110. S11 interface 235 may be activated when MME device 230 needs to communicate with SGW 240, such as when the particular UE 110 attaches to access network 130, when bearers need to be added or modified for an existing session for the particular UE 110, when a connection to a new PGW device 250 needs to created, or during a handover procedure (e.g., when the particular UE 110 needs to switch to a different SGW 240).

HSS device 260 may store information associated with UEs 110 and/or information associated with users of UEs 110. For example, HSS device 260 may store user profiles that include authentication and access authorization information. HSS device 260 may store subscription status information for SIM cards 120. HSS device 260 may receive the subscription status information from provisioning system 150. MME device 230 may communicate with HSS device 260 through an S6a interface 265. S6a interface 265 may be implemented, for example, using a Diameter protocol. PGW device 250 may communicate with HSS device 260 through an S6b interface 270. S6b interface 270 may be implemented, for example, using a Diameter protocol. PGW 250 250 may obtain subscription information for SIM card 120 from HSS device 260 using S6b interface 270 when PGW device 250 authenticates SIM card 120 to determine what network services SIM card 120 is authorized to use and to authorize an Internet Access Point Name (APN) for SIM card 120. PGW device 250 may then send a PCO message that includes the subscription information to UE 110 via SGW device 240 and via eNodeB 210.

In other implementations, MME device 230 may obtain the subscription status information from HSS device 260 when MME device 230 authenticates UE 110 in response to UE 110 requesting to attach to access network 130. MME device 230 may generate a PCO message that includes the subscription status information. MME device 230 may send the PCO message to UE 110 via eNodeB 210.

Furthermore, provisioning system 150 may generate an update for SIM card 120 and may provide the update to SIM OTA system 160. Additionally, provisioning system 150 may send an indication that a new update is available to access network 130. In some implementations, provisioning system 150 may send the update indication to HSS device 260. HSS device 260 may forward the indication to PGW device 250 and PGW device 250 may generate a PCO message that includes an indication that an update is available for SIM card 120 and may send the PCO message to UE 110 via SGW device 240 and eNodeB 210. In other implementations, HSS device 260 may forward the indication to MME device 230 and MME device 230 may generate a PCO message that include an indication that an update is available for SIM card 120 and may send the PCO message to UE 110 via eNodeB 210.

Although FIG. 2 shows exemplary components of access network 130, in other implementations, access network 130 may include fewer components, different components, differently arranged components, or additional components than depicted in FIG. 2. Additionally or alternatively, one or more components of access network 130 may perform functions described as being performed by one or more other components of access network 130.

Figure 3A:
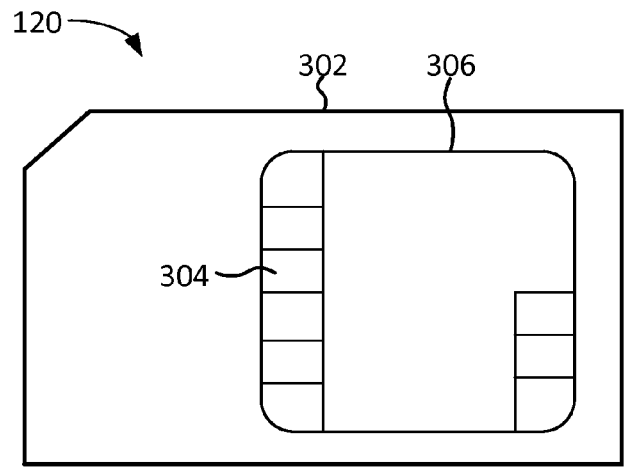
FIG. 3A is a diagram illustrating exemplary components of the Subscriber Identity Module (SIM) of FIG. 1.

FIG. 3A is a diagram illustrating example components of SIM card 120. As shown in FIG. 3A, SIM card 120 may include a housing 302, contacts 304, and an integrated circuit (IC) area 306. Housing 302 may protect IC area 306 from outside elements. Housing 302 may include a structure configured to hold contacts 304 and IC area 306, and may be formed from a variety of materials. For example, housing 302 may be formed from plastic, metal, or a composite. Contacts 304 may include one or more contacts to electronically connect SIM card 120 to UE 110. Contacts 304 may include a power contact to supply electrical power from UE 110 to SIM card 120.

IC area 306 may include one or more SIM modules. For example, IC area 306 may include a Universal SIM (USIM) that stores subscriber information and authentication information for connecting to a GSM access network and/or for connecting to an LTE access network; an Internet Protocol Multimedia Subsystem (IMS) that stores a subscriber's IMS identity, such as a public IMS identity and a private IMS identity; and/or a CDMA SIM (CSIM) that stores subscriber information and authentication information for accessing a CDMA access network. Furthermore, IC area 306 may include one or more MNO profiles and a profile handler for enabling a particular MNO profile based on a user selection or based on an automatic selection. The MNO profiles may be accessed by UE 110 using a profile selection application programming interface (API).

Although FIG. 3A shows example components of SIM card 120, in other implementations, SIM card 120 may include fewer components, different components, differently arranged components, or additional components than depicted in FIG. 3A. Additionally or alternatively, one or more components of SIM card 120 may perform the tasks described as being performed by one or more other components of SIM card 120.

Figure 3B:
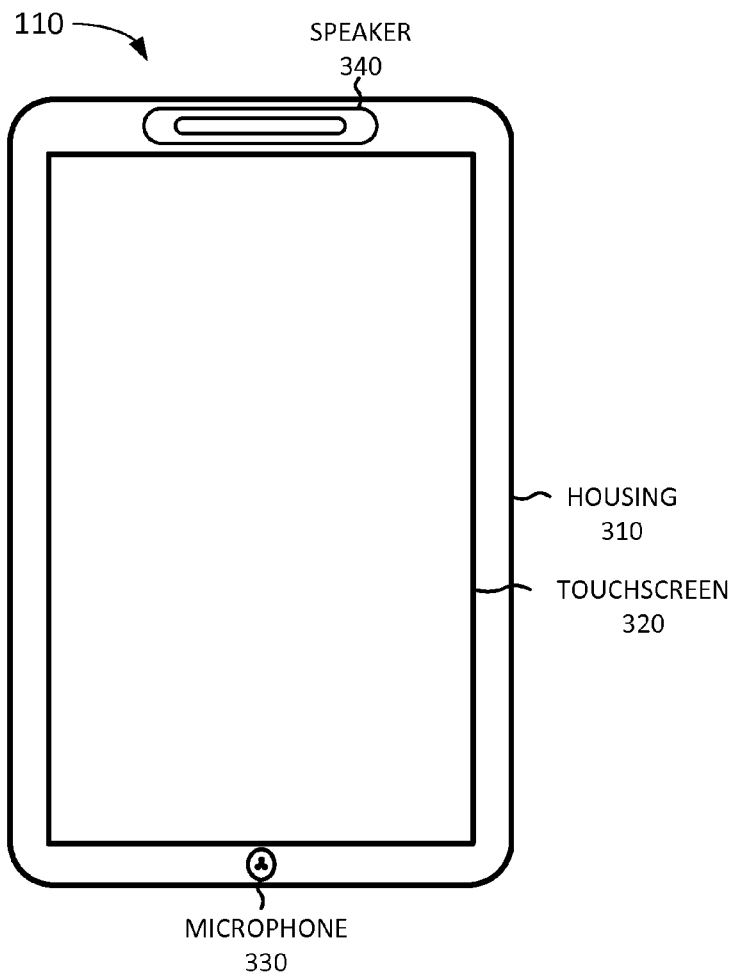
FIG. 3B is a diagram illustrating exemplary components of the user equipment (UE) of FIG. 1.

FIG. 3B is a diagram of exemplary components of UE 110 according to an implementation. As shown in FIG. 3B, UE 110 may include a housing 310, a touchscreen 320, a microphone 330, and a speaker 340.

Housing 310 may enclose UE 110 and may protect the components of UE 110 from the outside elements (e.g., moisture, dirt, etc.). Touchscreen 320 may include a display device and an input device configured to detect a user's touch. While FIG. 3B illustrates UE 110 with a touchscreen, in other implementations, UE 110 may not necessarily include a touchscreen. For example, UE 110 may include a display and a keyboard and/or keypad. Touchscreen 320 may include a liquid crystal display (LCD), an electronic ink display (e.g., an electrophoretic display), an electroluminescent display, and/or another type of display. Furthermore, touchscreen 320 may include touch sensors, such as capacitive sensors (e.g., surface capacitive sensors, projected capacitive touch sensors, etc.), resistive sensors (e.g., analog resistive sensors, digital resistive sensors, etc.), optical sensors (e.g., optical imaging sensors, rear diffused illumination sensors, infrared grid sensors, diffused surface illumination sensors, etc.), acoustic wave sensors (e.g., surface acoustic wave sensors, bending wave sensors, etc.), and/or another type of touch sensors. Furthermore, touchscreen 320 may include sensors to sense an amount of force being applied to touchscreen 320, such as piezoresistive sensors.

Microphone 330 may receive audio signals and convert the received audio signals to electrical signals for UE 110. Speaker 340 may receive electrical signals from within UE 110 and generate audio signals based on the received electrical signals.

UE 110 may include additional sensors (not shown in FIG. 3B). For example, UE 110 may include one or more tilt sensors, such as accelerometers and/or gyroscopes, configured to sense a tilt, position, and/or orientation of UE 110 in space; one or more Global Positioning System (GPS) receivers; one or more magnetic field sensors (e.g., to sense the magnetic North); motion detection sensors to sense motion in the vicinity of UE 110; and/or other types of sensors.

Although FIG. 3B shows exemplary components of UE 110, in other implementations, UE 110 may include fewer components, different components, differently arranged components, or additional components than those depicted in FIG. 3B. Additionally or alternatively, one or more components of UE 110 may perform functions described as being performed by one or more other components of UE 110. For example, in some implementations, UE 110 may include an embedded device configured to communicate with a server device using an M2M interface and may not include a user interface, such as touchscreen 320.

Figure 4:
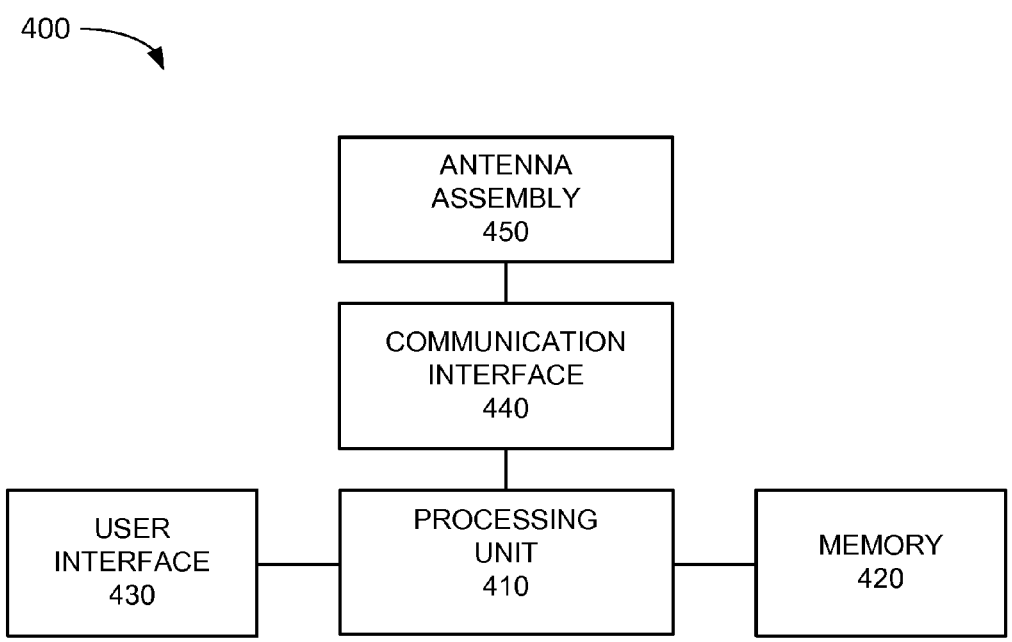
FIG. 4 is a diagram illustrating exemplary components of a device that may be included in a device of FIG. 1.

FIG. 4 is a diagram illustrating example components of a device 400 according to an implementation described herein. UE 110 and/or SIM card 120 may each include one or more devices 400. As shown in FIG. 4, device 400 may include a processing unit 410, a memory 420, a user interface 430, a communication interface 440, and an antenna assembly 450.

Processing unit 410 may include one or more processors, microprocessors, application specific integrated circuits (ASICs), field programmable gate arrays (FPGAs), and/or other processing logic. Processing unit 410 may control operation of device 400 and its components.

Memory 420 may include a random access memory (RAM) or another type of dynamic storage device, a read only memory (ROM) or another type of static storage device, a removable memory card, and/or another type of memory to store data and instructions that may be used by processing unit 410.

User interface 430 may allow a user to input information to device 400 and/or to output information from device 400. Examples of user interface 430 may include a speaker to receive electrical signals and output audio signals (e.g., speaker 340); a camera to receive image and/or video signals and output electrical signals; a microphone to receive sounds and output electrical signals (e.g., microphone 330); buttons (e.g., a joystick, control buttons, a keyboard, or keys of a keypad) and/or a touchscreen to receive control commands (e.g., touchscreen 320); a display, such as an LCD, to output visual information (e.g., touchscreen 320); an actuator to cause device 400 to vibrate; and/or any other type of input or output device. In some implementations, such as a device 400 included in SIM card 120, user interface 430 may correspond to contacts 304.

Communication interface 440 may include a transceiver that enables mobile communication device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 440 may include a transmitter that converts baseband signals to radio frequency (RF) signals and/or a receiver that converts RF signals to baseband signals. Communication interface 440 may be coupled to antenna assembly 450 for transmitting and receiving RF signals.

Communication interface 440 may include a logical component that includes input and/or output ports, input and/or output systems, and/or other input and output components that facilitate the transmission of data to other devices. For example, communication interface 440 may include a network interface card (e.g., Ethernet card) for wired communications and/or a wireless network interface (e.g., a WiFi) card for wireless communications. Communication interface 440 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 450 may include one or more antennas to transmit and/or receive RF signals. Antenna assembly 450 may, for example, receive RF signals from communication interface 440 and transmit the signals and receive RF signals and provide them to communication interface 440.

As described herein, device 400 may perform certain operations in response to processing unit 410 executing software instructions contained in a computer-readable medium, such as memory 420. A computer-readable medium may be defined as a non-transitory memory device. A non-transitory memory device may include memory space within a single physical memory device or spread across multiple physical memory devices. The software instructions may be read into memory 420 from another computer-readable medium or from another device via communication interface 440. The software instructions contained in memory 420 may cause processing unit 410 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Additionally or alternatively, one or more components of device 400 may perform the tasks described as being performed by one or more other components of device 400.

Figure 5:
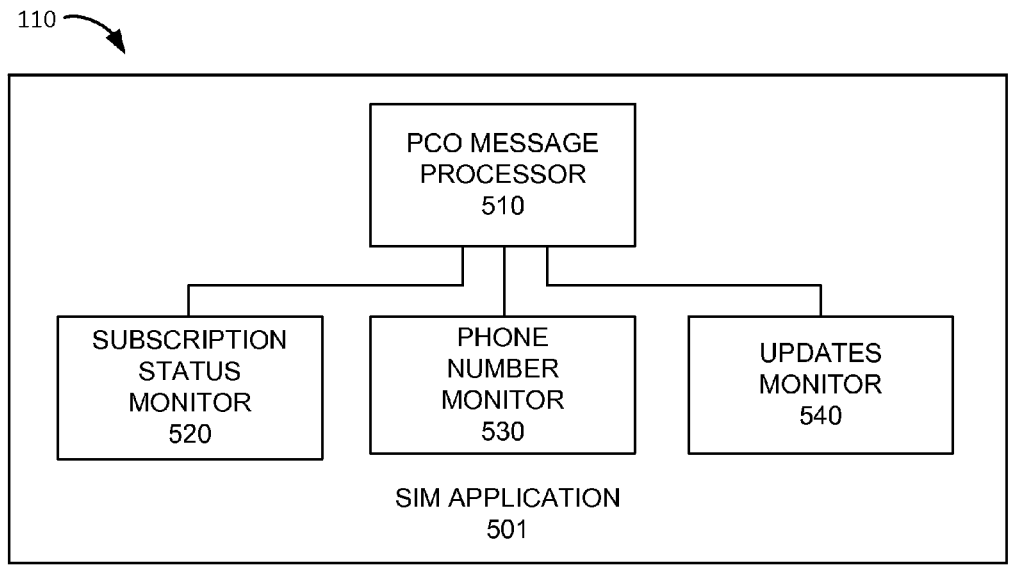
FIG. 5 is a diagram illustrating exemplary functional components of the UE of FIG. 1.

FIG. 5 is a diagram illustrating exemplary functional components of UE 110 according to an implementation described herein. The functional components of UE 110 may be implemented, for example, via processing unit 410 executing instructions from memory 420. Alternatively, some or all of the functional components of SIM card 120 may be implemented via hard-wired circuitry. As shown in FIG. 5, UE 110 may include a SIM application 501. SIM application 501 may manage activation and/or updates for SIM card 120. As shown in FIG. 5, SIM application 501 may include a PCO message processor 510, a subscription status monitor 520, a phone number monitor 530, and an updates monitor 540.

PCO message processor 510 may detect PCO messages received from access network 130 and may process the detected PCO messages. PCO message processor 510 may identify a subscription status container field in a received PCO message and may retrieve subscription status information from the subscription status container field. Additionally or alternatively, PCO message processor 510 may identify an update status container field in the received PCO message and may retrieve update status from the update status container field.

Subscription status monitor 520 may determine a subscription status for SIM card 120 based on the subscription status information retrieved from the received PCO message. For example, subscription status monitor 520 may map a value included in the subscription status container field to a subscription status. As an example, a first value may correspond to an active subscription with available data usage, a second value may correspond to an active subscription with no available data usage, a third value may correspond to a pre-paid subscription, a fourth value may correspond to no valid subscription. As another example, a first value may correspond to an indication that SIM card 120 is allowed onto access network 130 and a second value may correspond to an indication that SIM card 120 is not allowed onto access network 130. If SIM card 120 is associated with a valid subscription, subscription status monitor 520 may instruct SIM card 120 to contact SIM OTA system 160. If SIM card 120 is not associated with a valid subscription, subscription status monitor 520 may instruct SIM card 120 not to contact SIM OTA system 160.

Phone number monitor 530 may determine a telephone number assigned to SIM card 120 based on information included in the received PCO message. For example, the subscription status container field may include the telephone number assigned to SIM card 120 and PCO message processor 510 may provide the telephone number to phone number monitor 530. Phone number monitor 530 may determine whether the phone number retrieved from the PCO message is different from a phone number previously assigned to SIM card 120 and stored in SIM card 120. If the retrieved phone number is different from the previously assigned phone number, phone number monitor 530 may instruct SIM card 120 to contact SIM OTA system 160. If the retrieved phone number is the same as the previously assigned phone number, phone number monitor 530 may instruct SIM card 120 not to contact SIM OTA system 160.

Updates monitor 540 may determine whether any updates are available for SIM card 120 based on the updates status information retrieved from the received PCO message. For example, updates status monitor 540 may map a value included in the updates status container field to a particular update status. As an example, a first value may correspond to an indication that updates are available and a second value may correspond to an indication that there are no new updates. If updates are available, updates status monitor 540 may instruct SIM card 120 to contact SIM OTA system 160. If no new updates are available, updates status monitor 540 may instruct SIM card 120 not to contact SIM OTA system 160.

Although FIG. 5 shows exemplary functional components of UE 110, in other implementations, UE 110 may include fewer functional components, different functional components, differently arranged functional components, or additional functional components than depicted in FIG. 5. Additionally or alternatively, one or more functional components of UE 110 may perform functions described as being performed by one or more other functional components of UE 110. Furthermore, though SIM application 501 is described as being implemented in UE 110 with respect to the description of FIG. 5, in other implementations, SIM application 501 may be implemented directly in SIM card 120.

Figure 6:
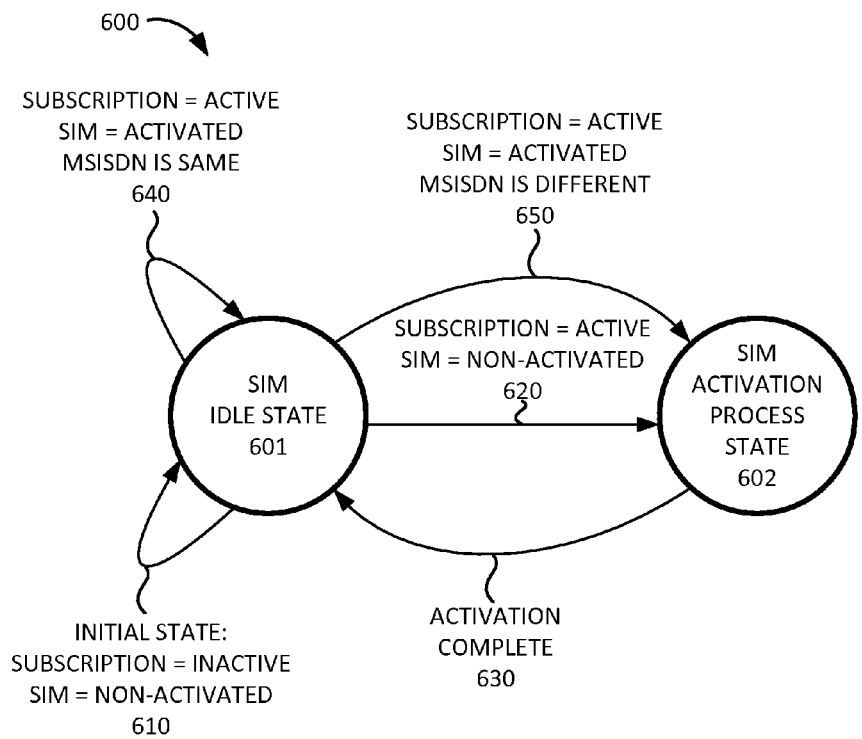
FIG. 6 is a diagram illustrating an exemplary finite state machine that may be implemented in the SIM of FIG. 1.

FIG. 6 is a diagram illustrating an exemplary finite state machine (FSM) 600 that may be implemented in SIM card 120. FSM 600 may be implemented, for example, via processing unit 410 executing instructions from memory 420. Alternatively, some or all of the functional components of FSM 600 may be implemented via hard-wired circuitry. As shown in FIG. 6, FSM 600 may include a SIM idle state 601 and a SIM activation process state 602. When SIM card 120 is in SIM idle state 601, SIM card 120 may remain idle and may not communicate with SIM OTA 160 or with any other devices. When SIM card 120 is in SIM activation process state 602, SIM card 120 may initiate a communication process with SIM OTA system 160 to activate (or to re-activate) SIM card 120.

FSM 600 may include a state transition 610 from SIM idle state 601 back to SIM idle state 601 executed in response to an inactive subscription status and a non-activated state of SIM card 120. FSM 600 may include a state transition 620 from SIM idle state 601 to SIM activation process state 602 executed in response to an active subscription status and a non-activated SIM card 120. FSM 600 may include a state transition 630 from SIM activation process state 602 back to SIM idle state 601 executed in response to the activation process being completed. FSM 600 may include a state transition 640 from SIM idle state 601 to SIM activation process state 602 executed in response to an active subscription status and an activated state of SIM card 120 if a determination is made that the phone number assigned to SIM card 120 is different from a previously assigned SIM card. FSM 600 may include a state transition 650 from SIM idle state 601 back to SIM idle state 601 executed in response to an active subscription status and an activated state of SIM card 120 if a determination is made that the phone number assigned to SIM card 120 is the same as a previously assigned SIM card. State transitions 610, 620, 630, 640, and 650 may be executed while UE 110 is attached to access network 130.

Although FIG. 6 shows exemplary states and state transitions of FSM 600, in other implementations, FSM 600 may include different, differently arranged, or additional states or state transitions than depicted in FIG. 6.

FIG. 7 is a diagram illustrating an exemplary Protocol Configuration Option (PCO) message 700 according to an implementation described herein. As shown in FIG. 7, PCO message 700 may include a PCO header 710, one or more protocol identifier (ID) fields 720-A to 720-N and corresponding protocol content fields 725-A to 725-N, and one or more container ID fields 730-A to 730-N and corresponding container content fields 735-A to 735-N.

PCO header 710 may include information identifying the message as a PCO message. Protocol ID field 720 may identify a particular protocol and protocol content field 725 may include content associated with a particular protocol. The particular protocol may correspond to a protocol used by access network 130 to communicate with UE 110. Container ID field 730 may identify a particular container and container content field 735 may store content associated with the particular container. Each particular container may be assigned to carry a particular piece of information or multiple pieces of information.

PCO message 700 may include a subscription status container ID field 730-X and a corresponding subscription status field 735-X. Subscription status container ID field 730-X may identify subscription status field 735-X as storing subscription status information and subscription status field 735-X may store the subscription status information. In some implementations, the subscription status information may be represented by a value (e.g., a first value may correspond to an active subscription with available data usage, a second value may correspond to an active subscription with no available data usage, a third value may correspond to a pre-paid subscription, a fourth value may correspond to no valid subscription, etc.). Furthermore, subscription status field 735-X may include a telephone number assigned to SIM card 120. The telephone number may correspond to an MSISDN, an IMSI number, an MDN, and/or another type of telephone number.

PCO message 700 may also include an update status container ID field 730-Y and a corresponding update status field 735-Y. Update status container ID field 730-Y may identify update status field 735-Y as storing update status information and update status field 735-Y may store the update status information. In some implementations, the subscription status information may be represented by a value, such as a first value indicating an available update for SIM card 120 and a second value indicating that no new updates are available. In other implementations, the subscription status information may indicate a type of available update, such as an urgency type (e.g., critical update, optional update, etc.); an update type for a particular application of SIM card 120 (e.g., activation application update, billing application update, authentication application update, updates application update, etc.); an update type for a particular Mobile Network Operator (MNO) (e.g., authentication keys update for a particular MNO), an update type for a particular SIM card 120 model, a roaming list update, and/or other types of updates.

Furthermore, in some implementations, update status field 735-Y may include the update information associated with an update. For example, if the update corresponds to a roaming list update, update status field 735-Y may include the updates to the roaming list. SIM card 120 may retrieve the update information from update status field 735-Y and may perform the update without having to communicate with SIM OTA system 160.

Although FIG. 7 shows exemplary fields of PCO message 700, in other implementations, PCO message 700 may include different, differently arranged, fewer, or additional fields than depicted in FIG. 7.

Figure 8:
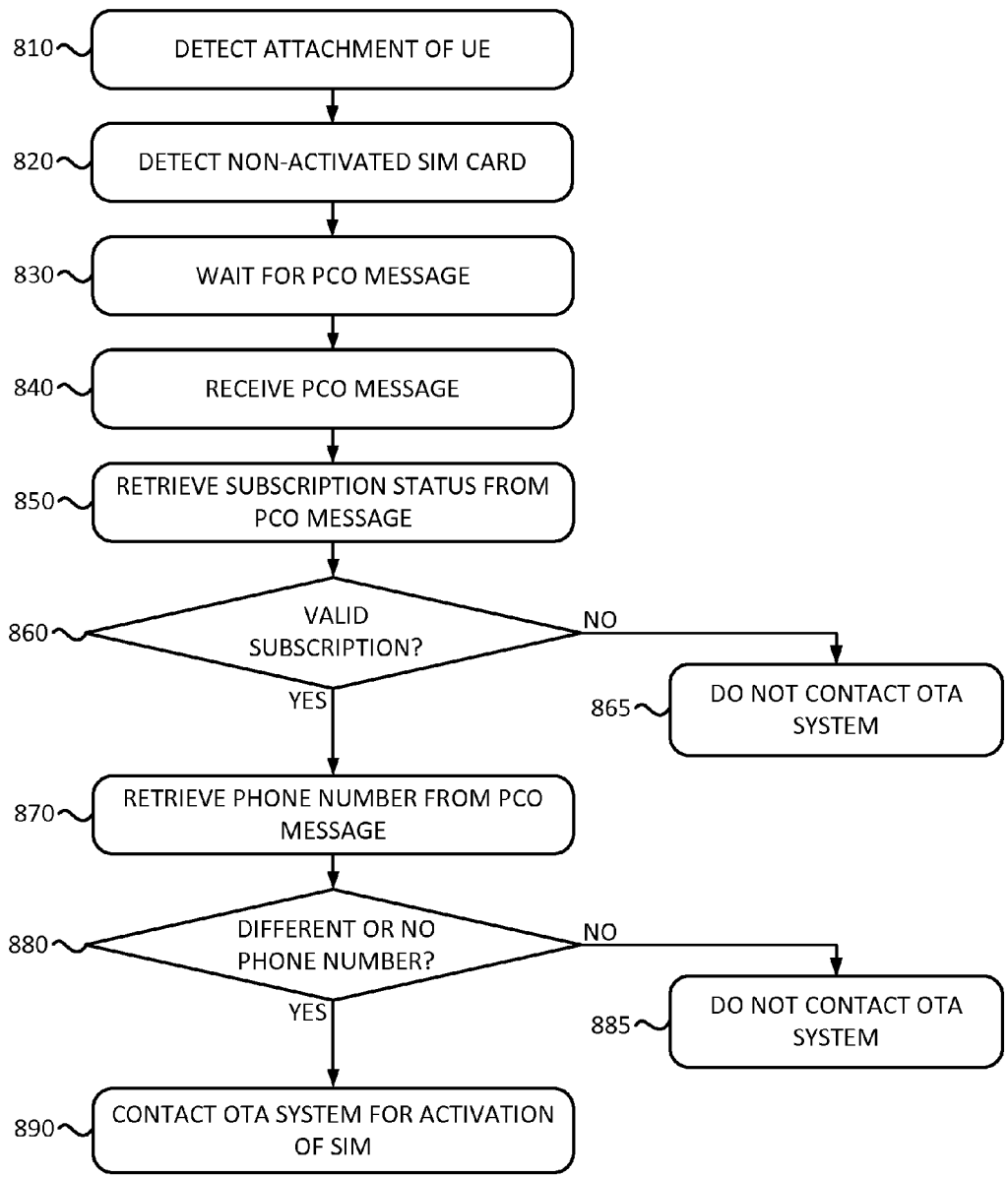
FIG. 8 is a flowchart of a subscription-aware SIM process according to an implementation described herein.

FIG. 8 is a flowchart of a subscription-aware SIM process according to an implementation described herein. In some implementations, the process of FIG. 8 may be performed by UE 110 and/or SIM card 120. In other implementations, some or all of the process of FIG. 8 may be performed by another device or a group of devices separate from UE 110 and/or SIM card 120.

The process of FIG. 8 may include detecting an attachment of UE 110 (block 810). For example, SIM application 501 may detect that communication interface 440 of UE 110 has established a connection with access network 130 via an attachment procedure (e.g., an LTE attach procedure). A non-activated SIM card may be detected (block 820). For example, SIM application 501 may detect that SIM card 120 is in a non-activated state. In some situations, the process of FIG. 8 may be carried out even if SIM card 120 is in an activated state (e.g., if re-activation needs to be performed because a different telephone number has been assigned to SIM card 120).

The process of FIG. 8 may wait for a PCO message (block 830). For example, SIM application 501 may wait to determine whether an activation and/or update process is to be performed by SIM card 120 until a PCO message is received from access network 130. In some implementations, SIM application 501 may explicitly instruct SIM card 120 not to contact SIM OTA system 160 until a determination is made whether SIM OTA system 160 is to be contacted.

A PCO message may be received (block 840) and a subscription status may be retrieved from the received PCO message (block 850). For example, SIM application 501 may detect that a PCO message has been received by communication interface 440 of UE 110 from access network 110. In some implementations, the PCO message may be received from PGW device 250 (via SGW device 240 and eNodeB 210). In other implementations, the PCO message may be received from MME device 230 (via eNodeB 210). In yet other implementations, eNodeB 210 may generate the PCO message and send the PCO message to UE 110. PCO message processor 510 of SIM application 501 may detect subscription status container ID 730-X in the received PCO message and may retrieve the subscription status for SIM card 120 from subscription status field 735-X.

A determination may be made as to whether there is a valid subscription for SIM card 120 (block 860). For example, subscription status monitor 520 may map the retrieved subscription status onto a value that indicates a valid subscription. A valid subscription may indicate that a subscription exists for SIM card 120 and that SIM card 120 has permission to connect to core network 140. In some implementations, the subscription status information may correspond to one of two values: a first value indicating that SIM card 120 has permission to connect to core network 140 via access network 130, and a second value indicating that SIM card 120 does not have permission to connect to core network 140 via access network 130. In other implementations, the subscription status information may include additional information, such as whether SIM card 120 is associated with a pre-paid account, whether SIM card 120 has sufficient data usage associated with the subscription to connect to core network 140, whether the subscription includes a monetary balance that is greater than a threshold, and/or other types of additional information. Subscription status monitor 520 may use the additional information to determine whether SIM card 120 has permission to connect to core network 140 and, consequently, whether SIM card 120 is to contact SIM OTA system 160 to initiate activation.

If it is determined that SIM card 120 does not have a valid subscription (block 860—NO), a determination may be made to not contact SIM OTA system 160 (block 865). For example, SIM application 501 may instruct SIM card 120 not to initiate an activation process with SIM OTA system

160. If it is determined that SIM card 120 does have a valid subscription (block 860—YES), processing may continue to retrieve a phone number from the received PCO message (block 870). For example, SIM application 501 may access subscription status container field 735-X and may retrieve a phone number that has been assigned to SIM card 120.

A determination may be made as to whether there is a different phone number or no phone number assigned to SIM card 120 (block 880). For example, phone number monitor 530 of SIM application 501 may determine whether no phone number has been assigned to SIM card 120 (e.g., subscription status container field 735-X may include no phone number information or may include a null value for the phone number) or may compare the retrieved phone number with a phone number previously assigned to SIM card 120 and stored in SIM card 120.

If it is determined that the phone number is not different (block 880—NO), a determination may be made not to contact SIM OTA system 160 (block 885). For example, SIM application 501 may instruct SIM card 120 not to initiate an activation process with SIM OTA 160. If it is determined that the phone number is different from a previously assigned phone number to SIM card 120 or that no phone number has been assigned to SIM card 120 (block 880—YES), a determination may be made to contact SIM OTA system 160 (block 890). For example, SIM application 501 may instruct SIM card 120 to initiate an activation process with SIM OTA 160. Alternatively, in some implementations, SIM application 501 may be configured to update the assigned telephone number without SIM card 120 having to contact SIM OTA system 160. For example, SIM application 501 may instruct SIM card 120 to update the assigned phone number from the previously assigned phone number to the phone number retrieved from the received PCO message.

Figure 9:
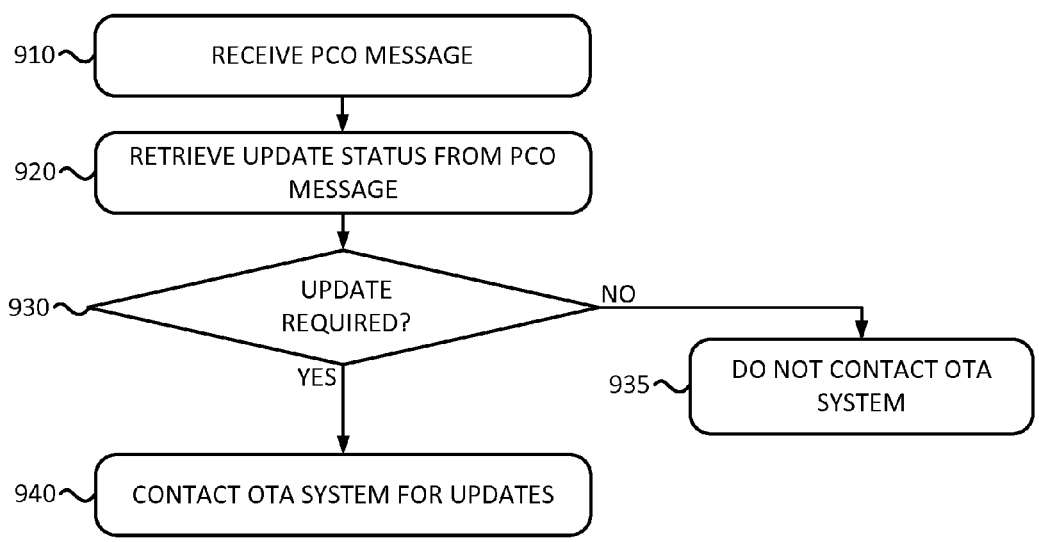
FIG. 9 is a flowchart of a process for updating a SIM according to an implementation described herein.

FIG. 9 is a flowchart of a process for updating a SIM according to an implementation described herein. In some implementations, the process of FIG. 9 may be performed by UE 110 and/or SIM card 120. In other implementations, some or all of the process of FIG. 9 may be performed by another device or a group of devices separate from UE 110 and/or SIM card 120.

The process of FIG. 9 may include receiving a PCO message (block 910) and retrieving an update status from the PCO message (block 920). For example, SIM application 501 may detect that a PCO message has been received by communication interface 440 of UE 110 from access network 130. In some implementations, the PCO message may be received from PGW device 250 (via SGW device 240 and eNodeB 210). In other implementations, the PCO message may be received from MME device 230 (via eNodeB 210). In yet other implementations, eNodeB 210 may generate the PCO message and send the PCO message to UE 110. PCO message processor 510 of SIM application 501 may detect update status container ID 730-Y in the received PCO message and may retrieve the update status for SIM card 120 from update status field 735-Y.

A determination may be made as to whether an update is required (block 930). For example, updates monitor 540 may determine whether the update information included in the received PCO message indicates that an update is available for SIM card 120 at SIM OTA system 160.

If it is determined that an update is not required (block 930—NO), a determination may be made to not contact SIM OTA system 160 (block 935). For example, SIM application 501 may instruct SIM card 120 not to initiate an activation process with SIM OTA system 160. If it is determined that an update is required (block 930—YES), a determination may be made to contact SIM OTA system 160 (block 940). For example, SIM application 501 may instruct SIM card 120 to initiate an update process with SIM OTA 160. Alternatively, in some implementations, SIM application 501 may be configured to update SIM card 120 without having to contact SIM OTA system 160. For example, update status field 735-Y may include information required to perform the update and SIM application 501 may instruct SIM card 120 to update using update information retrieved from the received PCO message.

FIG. 10 is an exemplary signal flow diagram 1000 according to an implementation described herein. FIG. 10 illustrates how SIM card 120 may initiate an activation process based on UE 110 receiving subscription status information. As shown in FIG. 10, signal flow diagram 1000 may include provisioning system 150 generating subscription information for SIM card 120 based on a subscription provisioned for the user associated with SIM card 120 (e.g., user submits an order for a subscription, etc.). Provisioning system 150 may send subscription information to HSS device 260 (signal 1010). Furthermore, provisioning system 150 may send activation information to SIM OTA system 160 based on the subscription information (signal 1012). The activation information may enable SIM OTA system 160 to authenticate SIM card 120, update information stored on SIM card 120, and enable SIM card 120 to change from a non-activated state to an activated state.

After UE 110 is powered on and the communication capability of UE 110 is activated, UE may detect the presence of eNodeB 210 and may send an attach request to eNodeB 210 (signal 1020). The attach request may include information identifying UE 110 and/or may include information identifying SIM Card 120. In some implementations, UE 110 may instruct SIM card 120 not to initiate an activation process until instructed to do so by UE 110 (not shown in FIG. 10). eNodeB 210 may forward the attach request to MME device 230 (signal 1022). MME device 230 may send a create session request to PGW device 250 (signal 1024). The create session request may cause PGW device 250 to reserve resources for creating a default bearer from UE 110 to PGW device 250 and/or to assign an IP address to UE 110 in order to enable a connection to core network 140.

In response, PGW device 250 may send an Authentication Authorization Request (AAR) to HSS device 260 to authorize an APN for UE 110 (signal 1026). HSS device 260 may retrieve the profile for SIM card 120 and may authenticate SIM card 120. Furthermore, HSS device 260 may retrieve the subscription information for SIM card 120. HSS device 260 may respond with an Authentication Authorization Answer (AAA) to PGW device 250 (signal 1028). The AAA may authorize authentication of SIM card 120 and may include the retrieved subscription information.

PGW device 250 may generate a PCO message 1030 that includes the subscription information obtained from HSS device 260. Furthermore, PGW device 250 may reserve the resources, may assign an IP address to UE 110, and may respond to MME device 230 with a session request response, indicating that a session has been created for UE 110 (signal 1040). The session request response may include the generated PCO message 1030 with the subscription information.

MME device 230 may send an activate default bearer instruction to eNodeB 210 and may include PCO message 1030 in the activate default bearer instruction (signal 1042). eNodeB 210 may instruct UE 110 to set up an RF bearer and may include PCO message 1030 in the instruction (signal 1044). UE 110 may receive the PCO message via eNodeB 210, may retrieve the subscription status information from the PCO message, and may determine that SIM card 120 has been provisioned a valid subscription by provisioning system 150 (block 1050). In response, UE 110 may instruct SIM card 120 to initiate an activation process with SIM OTA system 160 (signal 1052).

Furthermore, UE 110 may set up the RF bearer and respond with an RF bearer complete message (signal 1060) and eNodeB 210 may report to MME device 230 that the attachment procedure is complete (signal 1062). MME device 230 may respond by sending an update bearer message to PGW device 250 (signal 1064) and PGW device 250 may update the bearer based on the requirements of the established RF bearer and may respond back to MME device 230 with an update bearer response once the bearer has been updated (signal 1066). PGW device 250 may now communicate with UE 110 by advertising the IP edge router of core network 140 to UE 110 via eNodeB 210 (not shown in FIG. 10). In response, SIM card 120 may connect to SIM OTA system 160 via the connection to core network 140 through PGW device 250 and may perform an activation process with SIM OTA system 160 (signal 1070).

FIG. 11 is an exemplary signal flow diagram 1100 according to an implementation described herein. FIG. 11 illustrates how SIM card 120 may initiate an update process based on UE 110 receiving information indicating an available update. As shown in FIG. 11, signal flow diagram 1100 may include an attach procedure (block 1110) similar to the attach procedure explained above with respect to FIG. 10. At some time after UE 110 has attached to access network 130 and SIM card 120 has been activated, provisioning system 150 may generate an update for SIM card 120. Provisioning system 150 may provide update information that SIM OTA system 160 needs to perform the update to SIM OTA system 160 (signal 1120) and may send an update notification to HSS device 260 to indicate that an update is available for SIM card 120 (signal 1122). HSS device 260 may update a subscriber record associated with SIM card 120 to indicate the available update and may forward the update notification to PGW device 250 (signal 1124).

In response, PGW device 250 may generate a PCO message that includes update status container ID field 730-Y and update status field 735-Y, with update status field 735-Y including information indicating that the update is available (block 1130). PGW device 250 may forward the PCO message to UE 110 via eNodeB 210 (signals 1134 and 1136). In other implementations, HSS device 260 forwarding the update notification to MME device 230, and MME device 230 may send a PCO message to UE 110 via eNodeB 210.

UE 110 may retrieve the update notification information from the received PCO message and may detect that an update is available for SIM card 120 (block 1140). In response, UE 110 may instruct SIM card 120 to contact SIM OTA system 160 to check for updates (signal 1150). SIM card 120 may then send a request to SIM OTA system 160 to request updates and SIM OTA system 160 may perform the update to SIM card 120 (signal 1160).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while implementations have been described with respect to including subscription information and/or update information in a PCO message, in other implementations, subscription information and/or update information may be included in another type of message sent from access network 130 to UE 110. Furthermore, while implementations have been described with respect to SIM card 120 communicating with SIM OTA system 160, in other implementations, SIM card 120 may communicate with a different type of remote server device to perform activation and/or updates.

As another example, while series of blocks have been described with respect to FIGS. 8 and 9, and series of signal flows have been described with respect to FIGS. 10 and 11, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a wireless communication device, the method comprising:
   detecting, by the wireless communication device, attachment to a wireless access network;
   instructing, by the wireless communication device, a Subscriber Identity Module (SIM) card, included in the wireless communication device, to wait to determine whether to contact a SIM Over-the-air (OTA) system until subscription status information is received, in response to detecting the attachment to the wireless access network;
   receiving, by the wireless communication device, a Protocol Configuration Options (PCO) message from the wireless access network;
   retrieving, by the wireless communication device, the subscription status information for the SIM card from the received PCO message;
   determining, by the wireless communication device, whether the SIM card has a valid subscription based on the retrieved subscription status information; and
   instructing, by the wireless communication device, the SIM card not to initiate an activation process with the SIM OTA system, in response to determining that the SIM card does not have a valid subscription.

2. The method of claim 1, wherein instructing the SIM card to wait to determine whether to contact the SIM OTA system until subscription status information is received is further performed in response to detecting that the SIM card is not activated.

3. The method of claim 1, wherein determining whether the SIM card has a valid subscription based on the retrieved subscription status information includes determining that the SIM card has a valid subscription, and wherein the method further includes:
   retrieving a telephone number for the SIM card from the received PCO message;
   determining whether the retrieved telephone number is different from a previously assigned telephone number for the SIM card;
   instructing the SIM card not to initiate the activation process with the SIM OTA system, in response to determining that the retrieved telephone number is not different from the previously assigned telephone number for the SIM card; and
   instructing the SIM card to initiate the activation process with the SIM OTA system, in response to determining that the retrieved telephone number is different from the previously assigned telephone number for the SIM card.

4. The method of claim 1, wherein determining whether the SIM card has a valid subscription based on the retrieved subscription status information includes determining that the SIM card has a valid subscription, and wherein the method further includes:
   retrieving a telephone number for the SIM card from the received PCO message;
   determining that the retrieved telephone number is different from a previously assigned telephone number for the SIM card;
   updating the previously assigned telephone number for the SIM card with the retrieved telephone number; and
   instructing the SIM card not to initiate the activation process with the SIM OTA system, in response to updating the previously assigned telephone number for the SIM card with the retrieved telephone number.

5. The method of claim 1, wherein retrieving the subscription status information for the SIM card from the received PCO message includes:
   identifying a container field assigned to include the subscription status information; and
   retrieving the subscription status information from the identified container field.

6. The method of claim 5, further comprising:
   retrieving update status information for the SIM card from the received PCO message;
   determining whether an update is available for the SIM card based on the retrieved update status information; and
   instructing the SIM card to initiate an update process with the SIM OTA system, in response to determining that an update is available for the SIM card.

7. The method of claim 6, wherein retrieving the update status information for the SIM card from the received PCO message includes:
   identifying a container field assigned to include the update status information; and
   retrieving the update status information from the identified container field.

8. The method of claim 1, further comprising:
   receiving another PCO message from the wireless access network;
   retrieving update status information for the SIM card from the received other PCO message;
   determining whether an update is available for the SIM card based on the retrieved update status information; and
   instructing the SIM card to initiate an update process with the SIM OTA system, in response to determining that an update is available for the SIM card.

9. The method of claim 1, wherein the PCO message is received from at least one of a Mobility Management Entity (MME) device or a Packet Data Network Gateway (PGW) device associated with the wireless access network.

10. A wireless communication device comprising:
    a Subscriber Identity Module (SIM) card configured to store a subscriber profile; and
    logic configured to:
      detect attachment to a wireless access network;
      instruct the SIM card to wait to determine whether to contact a SIM Over-the-air (OTA) system until subscription status information is received, in response to detecting the attachment to the wireless access network;
      receive a Protocol Configuration Options (PCO) message from the wireless access network;
      retrieve subscription status information for the SIM card from the received PCO message;

determine whether the SIM card has a valid subscription based on the retrieved subscription status information; and instruct the SIM card to not initiate an activation process with the SIM OTA system, in response to determining that the SIM card does not have a valid subscription.

11. The wireless communication device of claim 10, wherein the logic is further configured to:

instruct the SIM card to wait to determine whether to contact the SIM OTA system until subscription status information is received in response to detecting that the SIM card is not activated.

12. The wireless communication device of claim 10, wherein, when determining whether the SIM card has a valid subscription based on the retrieved subscription status information, the logic is configured to determine that the SIM card has a valid subscription, and wherein the logic is further configured to:

retrieve a telephone number for the SIM card from the received PCO message;

determine whether the retrieved telephone number is different from a previously assigned telephone number for the SIM card;

instruct the SIM card not to initiate the activation process with the SIM OTA system, in response to determining that the retrieved telephone number is not different from the previously assigned telephone number for the SIM card; and instruct the SIM card to initiate the activation process with the SIM OTA system, in response to determining that the retrieved telephone number is different from the previously assigned telephone number for the SIM card.

13. The wireless communication device of claim 10, wherein, when determining whether the SIM card has a valid subscription based on the retrieved subscription status information, the logic is configured to determine that the SIM card has a valid subscription, and wherein the logic is further configured to:

retrieve a telephone number for the SIM card from the received PCO message;

determine that the retrieved telephone number is different from a previously assigned telephone number for the SIM card;

update the previously assigned telephone number for the SIM card with the retrieved telephone number; and instruct the SIM card not to initiate the activation process with the SIM OTA system, in response to updating the previously assigned telephone number for the SIM card with the retrieved telephone number.

14. The wireless communication device of claim 10, wherein, when retrieving the subscription status information for the SIM card from the received PCO message, the logic is further configured to:

identify a container field assigned to include the subscription status information; and retrieve the subscription status information from the identified container field.

15. The wireless communication device of claim 10, wherein the logic is further configured to:

retrieve update status information for the SIM card from the received PCO message;

determine whether an update is available for the SIM card based on the retrieved update status information; and instruct the SIM card to initiate an update process with the SIM OTA system, in response to determining that an update is available for the SIM card.

16. The wireless communication device of claim 15, wherein, when retrieving the update status information for the SIM card from the received PCO message, the logic is further configured to:

identify a container field assigned to include the update status information; and retrieve the update status information from the identified container field.

17. The wireless communication device of claim 10, wherein the logic is further configured to:

receive another PCO message from the wireless access network;

retrieve update status information for the SIM card from the received other PCO message;

determine whether an update is available for the SIM card based on the retrieved update status information; and instruct the SIM card to initiate an update process with the SIM OTA system, in response to determining that an update is available for the SIM card.

18. The wireless communication device of claim 10, wherein the PCO message is received from at least one of a Mobility Management Entity (MME) device or a Packet Data Network Gateway (PGW) device associated with the wireless access network.

19. A method, performed by a Subscriber Identity Module (SIM) card device, the method comprising:

detecting, by the SIM card device, that a wireless communication device associated with the SIM card device has attached to a wireless access network;

waiting, by the SIM card device, to determine whether to contact a SIM Over-the-air (OTA) system until subscription status information is received, in response to detecting the attachment to the wireless access network;

receiving, by the SIM card device, a Protocol Configuration Options (PCO) message from the wireless communication device;

retrieving, by the SIM card device, subscription status information for the SIM card device from the received PCO message;

determining, by the SIM card device, whether the SIM card device has a valid subscription based on the retrieved subscription status information;

selecting, by the SIM card device, not to initiate an activation process with a SIM Over-the-air (OTA) system, in response to determining that the SIM card device does not have a valid subscription;

retrieving, by the SIM card device, a telephone number for the SIM card device from the received PCO message in response to determining that the SIM card device does have a valid subscription;

determining, by the SIM card device, whether the retrieved telephone number is different from a previously assigned telephone number for the SIM card device;

selecting, by the SIM card device, not to initiate the activation process with the SIM OTA system, in response to determining that the retrieved telephone number is not different from the previously assigned telephone number for the SIM card device; and selecting, by the SIM card device, to initiate the activation process with the SIM OTA system, in response to determining that the retrieved telephone number is different from the previously assigned telephone number for the SIM card device.

20. The method of claim 19, further comprising:

retrieving update status information for the SIM card device from the received PCO message;

determining whether an update is available for the SIM card device based on the retrieved update status information; and initiating an update process with the SIM OTA system, in response to determining that an update is available for the SIM card device.

\* \* \* \* \*